(12) United States Patent
Nakakuki

(10) Patent No.: US 6,990,250 B2
(45) Date of Patent: Jan. 24, 2006

(54) IMAGE SIGNAL PROCESSING APPARATUS

(75) Inventor: Toshio Nakakuki, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 747 days.

(21) Appl. No.: 10/194,604

(22) Filed: Jul. 12, 2002

(65) Prior Publication Data

US 2003/0016880 A1 Jan. 23, 2003

(30) Foreign Application Priority Data

Jul. 17, 2001 (JP) .............................. 2001-216444

(51) Int. Cl.
*G06K 9/40* (2006.01)
*G03F 3/08* (2006.01)
(52) U.S. Cl. .................. 382/266; 382/260; 358/519
(58) Field of Classification Search ................ 382/167, 382/199, 263–264, 266, 269, 274; 348/254; 358/519; 345/596
See application file for complete search history.

(56) References Cited

U.S. PATENT DOCUMENTS

| | | | | |
|---|---|---|---|---|
| 3,729,580 A | * | 4/1973 | Schneider | 348/234 |
| RE29,570 E | * | 3/1978 | Breimer et al. | 348/253 |
| 4,200,888 A | * | 4/1980 | Blom | 348/625 |
| 5,196,924 A | * | 3/1993 | Lumelsky et al. | 348/674 |
| 5,235,410 A | * | 8/1993 | Hurley | 348/472 |
| 5,361,094 A | * | 11/1994 | Jang | 348/254 |
| 5,461,430 A | * | 10/1995 | Hagerman | 348/674 |
| 5,557,340 A | * | 9/1996 | Millward | 348/627 |
| 6,285,411 B1 | * | 9/2001 | Hentschel | 348/607 |
| 6,433,836 B1 | * | 8/2002 | Suzuki et al. | 348/625 |
| 6,909,435 B2 | * | 6/2005 | Willis | 345/596 |

* cited by examiner

*Primary Examiner*—Daniel Mariam
(74) *Attorney, Agent, or Firm*—Hogan & Hartson, LLP

(57) ABSTRACT

Changes in the degree of contour correction in accordance with luminance signal level differences in image processing are adjusted to be visually preferable. Gamma correction is performed by a gamma correction circuit (106) with respect to an intermediate image signal in which an edge signal is added to an original image signal. Meanwhile, gamma correction is performed by a gamma correction circuit (108) with respect to an intermediate image signal in which the edge signal is subtracted from the original image signal. These two intermediate image signals are subtracted from each other by a subtracter (110) and the output thereof is added as an aperture signal to the original image signal that is output from a Y signal gamma correction circuit (54).

7 Claims, 14 Drawing Sheets

(a)

(b)

(c)

(PRIOR ART)

(PRIOR ART)

(PRIOR ART)

IMAGE SIGNAL PROCESSING APPARATUS

BACKGROUND OF THE INVENTION

1. Field of the Invention

The present invention relates to an image signal processing apparatus for emphasizing a specific frequency component of an image signal and correcting the contour of a reproduced image.

2. Description of the Prior Art

Contour correction processing for emphasizing the contour of an image is one method of image quality adjustment. FIG. 1 show typical timing charts illustrating the principle of contour correction processing. FIG. 1(a) represents a luminance signal, which is-the original image signal. FIG. 1(b) is an aperture signal corresponding to a second-order differential waveform of the original image signal, where, after the second-order differential is taken of the original image signal, the signal with its polarity inverted is shown. The aperture signal fluctuates significantly at the rise and fall of the luminance signal, namely, at the edges in the image. FIG. 1(c) is the image signal after contour correction processing and is generated by adding the original image signal of FIG. 1(a) and the aperture signal of FIG. 1(b). At the image signal after contour correction processing, contour enhancement is performed so that during the rise the signal first falls then rises, and returns after exceeding a predetermined level. This emphasizes the contours of the image to improve image clarity.

FIG. 2 is a general block diagram of an aperture signal generator for generating the aperture signal. The signal that is input has a frequency component of a specific frequency band (near 1.5 MHz, for example) extracted by a bandpass filter 2. In this extraction process, noise pulses are easily created. To remove this noise, a coring circuit 4 is provided. The coring circuit 4 passes only pulses having an amplitude that exceeds a predetermined threshold and removes pulses having a lower amplitude as noise. Pulses passing the coring circuit 4 are multiplied by a predetermined gain at a gain circuit 6. Here, a second-order differential waveform generates an amplitude corresponding to the steepness of the rise and fall of the luminance signal. Namely, if the edge of the original picture is sharp, the degree of contour emphasis is increased by that much. However, excessive contour emphasis creates an unnatural image. To prevent this, a clipping circuit 8 is provided. When the amplitude of the second-order differential waveform that was gain-adjusted by the gain circuit 6 exceeds a set lower limit or upper limit, the clipping circuit 8 clips the waveform at the lower limit or upper limit.

In addition to performing the above-mentioned contour correction with respect to the luminance signal, a non-linear conversion processing is performed according to a predetermined conversion table gamma correction, the low luminance portions are enhanced, and the high luminance portions are suppressed to perform what is called gamma correction. A conventional method is described hereinafter for generating the luminance signal on which both contour correction and gamma correction are performed.

FIG. 3 is a simple block diagram of a signal processing circuit, which is a first conventional method for generating the luminance signal. The picture signal that is input, such as from an image pickup apparatus, has a frequency multiplexed luminance signal and chrominance signal, and a Y-LPF 20 is a low-pass filter that extracts the luminance signal component from the picture signal. The picture signal is input in parallel by both the Y-LPF 20 and an aperture signal generator 22. Then, the luminance signal at the output of the Y-LPF 20 and the aperture signal generated by the aperture signal generator 22 are added at an adder 24. The output signal of the adder 24 undergoes non-linear conversion at a gamma correction circuit 26 and a luminance signal is generated and output after contour correction and gamma correction.

FIG. 4 is a simple block diagram of a signal processing circuit, which is a second conventional method for generating the luminance signal. In this method, the aperture signal generator 22 generates the aperture signal on the basis of the luminance signal that is extracted at the Y-LPF 20, and is added with the output of the Y-LPF 20 at the adder 24. The output signal of the adder 24 then undergoes non-linear conversion at the gamma correction circuit 26 and a luminance signal is generated and output after contour correction and gamma correction.

FIG. 5 is a simple block diagram of a signal processing circuit, which is a third conventional method for generating the luminance signal. The picture signal is input in parallel by the Y-LPF 20 and the aperture signal generator 22. The luminance signal that is extracted at the Y-LPF 20 is input by the gamma correction circuit 26. The gamma-corrected luminance signal and the aperture signal generated at the aperture signal generator 22 are added at the adder 24. The resultant added signal is output as a luminance signal after aperture compensation and gamma correction.

FIG. 6 is a simple block diagram of a signal processing circuit, which is a fourth conventional method for generating the luminance signal. The picture signal has the luminance signal extracted at the Y-LPF 20 and the luminance signal is input by the gamma correction circuit 26. The aperture signal generator 22 generates the aperture signal on the basis of the gamma-corrected luminance signal, and this is added with the gamma-corrected luminance signal at the adder 24. The resultant added signal is output as the luminance signal after contour correction and gamma correction.

FIG. 7 shows typical signal waveforms illustrating a problem in the above-mentioned first and second methods. In the first and second methods, the aperture signal, after being combined with the luminance signal, undergoes gamma correction. FIG. 7(a) is the input signal to the gamma correction circuit 26 and shows the signal waveform where the aperture signal is combined with the luminance signal. In this input signal, the undershoot and overshoot resulting from the aperture signal both have the same magnitude of $\delta_0$. Meanwhile, FIG. 7(b) is the output signal from the gamma correction signal 26. In gamma correction, the level fluctuations in the output signal are suppressed with higher input signal levels. As a result, the magnitude $\delta_U$ of the overshoot after gamma correction is smaller than the magnitude $\delta_D$ of the undershoot. Namely, in the first and second methods, the relationship of $\delta_U < \delta_D$ results so that the effects of contour correction at the high luminance side and at the low luminance side of the signal are asymmetrical. This causes a problem in which contour emphasis is relatively small at the high luminance side and relatively large at the low luminance side.

Next, FIG. 8 shows typical signal waveforms illustrating a problem in the above-mentioned third method. In the third method, after gamma correction is performed on the luminance signal, the aperture signal is combined. FIG. 8(a) shows the input signal to the gamma correction circuit 26 and the waveform in which the signal level rises in two identical P steps. The two step rise of the luminance signal is similar, and either rise has an undershoot and overshoot of the same magnitude $\delta$ as the aperture signal. Meanwhile, FIG. 8(b) shows the output signal from the adder 24 and a signal where the aperture signal is combined with the gamma-corrected luminance signal. In the level change of the two-step luminance signal, the second step level change $P_2'$ becomes smaller than the first step level change $P_1'$ as a result of gamma correction. Meanwhile, the aperture signal is not affected by gamma correction, and contour correction of the same magnitude δ is performed at the rise of the luminance signal at both the first step and the second step. Namely, the magnitude of contour correction is the same despite the fact that the level change of the luminance signal is $P_2'<P_1'$. This signifies that the aperture compensation is relatively large at the high luminance side and relatively small at the low luminance side, which caused a problem of visually unnatural images.

In the above-mentioned fourth method, the aperture signal is generated on the basis of the gamma-corrected image signal. Thus, the level of noise pulses created by the differentiation process of the bandpass filter 2 in the aperture signal generator 22 changes in accordance with the luminance signal level. More specifically, the noise level at the high luminance side is relatively low and the noise level at the low luminance side is relatively large. As a result, this caused a problem where the noise could not be properly removed with the coring circuit 4 having a fixed threshold.

SUMMARY OF THE INVENTION

It is therefore an object of the present invention to solve the above-mentioned problems and provide an aperture compensation circuit for performing visually preferable contour emphasis regardless of level differences in the luminance signal.

An image signal processing apparatus relating to the present invention comprises a first gamma correction circuit for performing gamma correction with respect to an original image signal on the basis of first non-linear characteristic conversions, an edge signal generation circuit for generating an edge signal by extracting a specific frequency component of the original image signal, a second gamma correction circuit for performing gamma correction in accordance with second nonlinear characteristics with respect to a first intermediate image signal that is generated on the basis of the original image signal and the edge signal, a third gamma correction circuit for performing gamma correction in accordance with the second non-linear characteristic conversions with respect to a second intermediate image signal that is generated on the basis of the original image signal, a subtraction circuit for generating an aperture signal by calculating the difference between the gamma-corrected first intermediate image signal and the gamma-corrected second intermediate image signal, and an addition circuit for generating an output image signal by adding the aperture signal to the gamma-corrected original image signal.

Another image signal processing apparatus relating to the present invention further comprises a first filter circuit for generating, and supplying to the first gamma correction circuit, a first luminance signal by attenuating a first frequency band of the original image signal, and a second filter circuit for generating a second luminance signal by attenuating a second frequency band of the original image signal, wherein the first intermediate image signal is generated by adding the edge signal to the second luminance signal, and the second intermediate image signal is generated by subtracting the edge signal from the second luminance signal.

Another image signal processing apparatus relating to the present invention comprises a filter circuit for generating, and supplying to the first gamma correction circuit, a luminance signal by attenuating a specific band of the original image signal, wherein the first intermediate image signal is generated by adding the edge signal to the luminance signal, and the second intermediate image signal is generated by subtracting the edge signal from the luminance signal.

Yet another image signal processing apparatus relating to the present invention comprises a first filter circuit for generating, and supplying to the first gamma correction circuit, a first luminance signal by attenuating a first frequency band of the original image signal, and a second filter circuit for generating a second luminance signal by attenuating a second band of the original image signal, wherein the first intermediate image signal is generated by adding the edge signal to the second luminance signal, and the second intermediate image signal is the second luminance signal.

Still another image signal processing apparatus relating to the present invention comprises a filter circuit for generating, and supplying to the first gamma correction circuit, a luminance signal by attenuating a specific frequency band of the original image signal, wherein the first intermediate image signal is generated by adding the edge signal to the luminance signal, and the second intermediate image signal is the luminance signal.

DETAILED DESCRIPTION OF THE PREFERRED EMBODIMENTS

Embodiments of the present invention will be described hereinafter with reference to the attached drawings.

Figure 9:
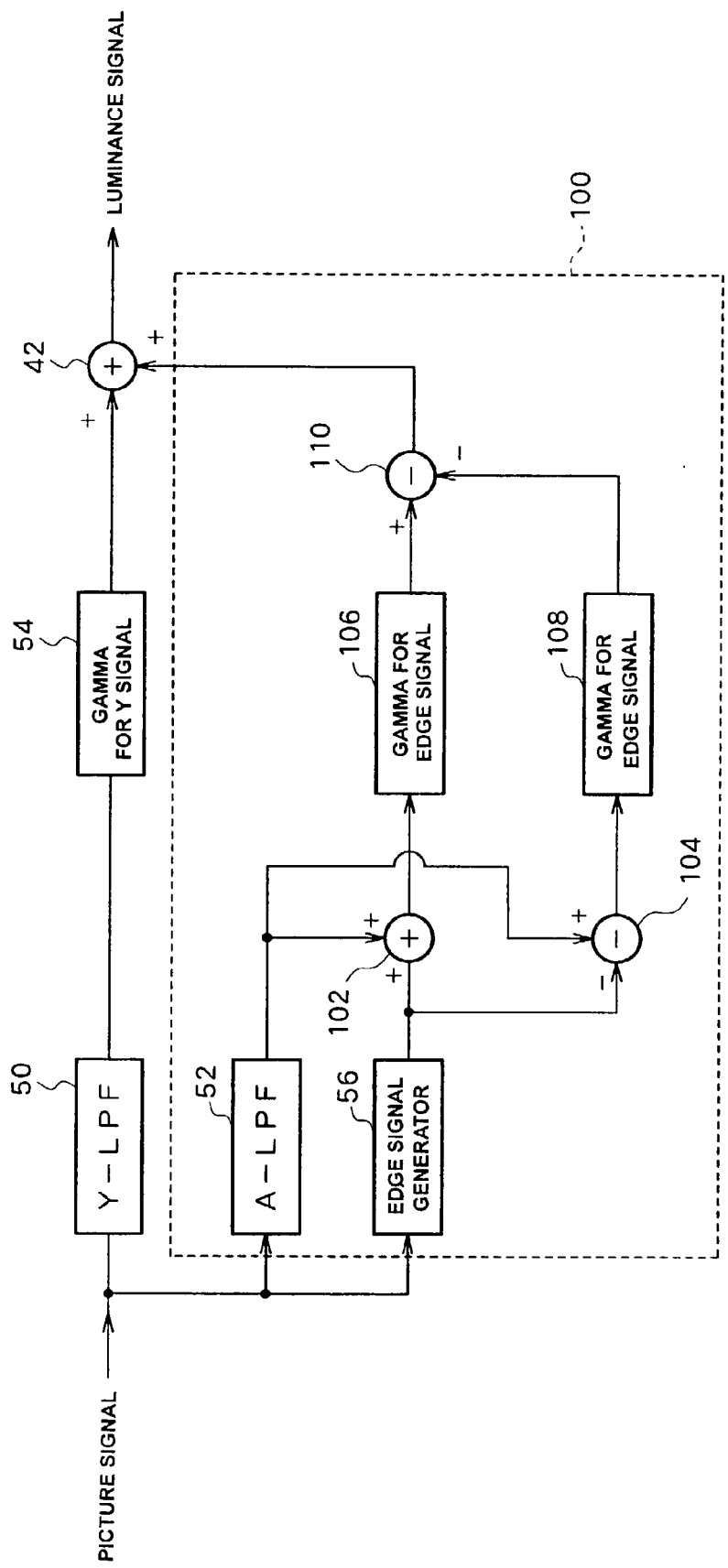
FIG. 9 is a simple block diagram of a luminance signal generator, which is an embodiment of the present invention.

FIG. 9 is a simple block diagram of a luminance signal generator, which is an embodiment of the present invention. This circuit has an aperture signal generator 100. The aperture signal generator 100 is provided in parallel with the main system for generating the gamma-corrected luminance signal from the picture signal that is input, such as from an image pickup apparatus, and generates an aperture signal from the picture signal. The luminance signal generator outputs a contour-emphasized output image signal by adding at the adder 42 the luminance signal that is output from the main system and the aperture signal that is output from the aperture signal generator 100.

Figure 10:
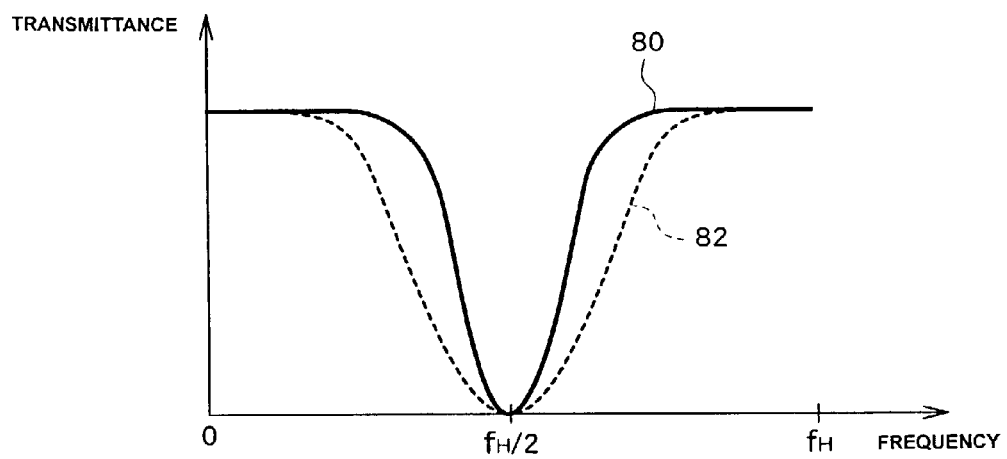
FIG. 10 is a frequency characteristic diagram showing the transmission characteristics of Y-LPF 50 and A-LPF 52.

The picture signal that is input, such as from an image pickup apparatus, is a frequency multiplexed luminance signal and chrominance signal, and an LPF (denoted hereinafter by Y-LPF) 50 provided in the main system and an LPF (denoted hereinafter by A-LPF) 52 provided in the aperture signal generator 100 are both low-pass filters for extracting the luminance signal component from the picture signal, and respectively generate a first luminance signal and a second luminance signal by attenuating the original image signal. FIG. 10 is a frequency characteristic diagram showing the transmission characteristics of the Y-LPF 50 and the A-LPF 52. Both filter circuits have a minimum point at ½ the horizontal sampling frequency $f_H$ and attenuate the output signal near this point. A characteristic 80 of the Y-LPF 50 is set to have a steep attenuation characteristic so that the resolution of the luminance signal is not impaired during filtering. Meanwhile, a characteristic 82 of the A-LPF 52 is set to have a gentle attenuation characteristic compared to the characteristic 80 of the Y-LPF 50. This is to avoid the introduction of a type of moiré noise called the jaggy in the second luminance signal used at the aperture signal generator 100. It should be noted that the circuit configuration can be simplified by supplying the output of the Y-LPF 50 to the aperture signal generator 100 and using this to perform aperture signal generation processing without providing the A-LPF 52.

The main system is comprised to include the Y-LPF 50 and a Y-signal gamma correction circuit 54 for performing gamma correction on its output.

Figure 1:
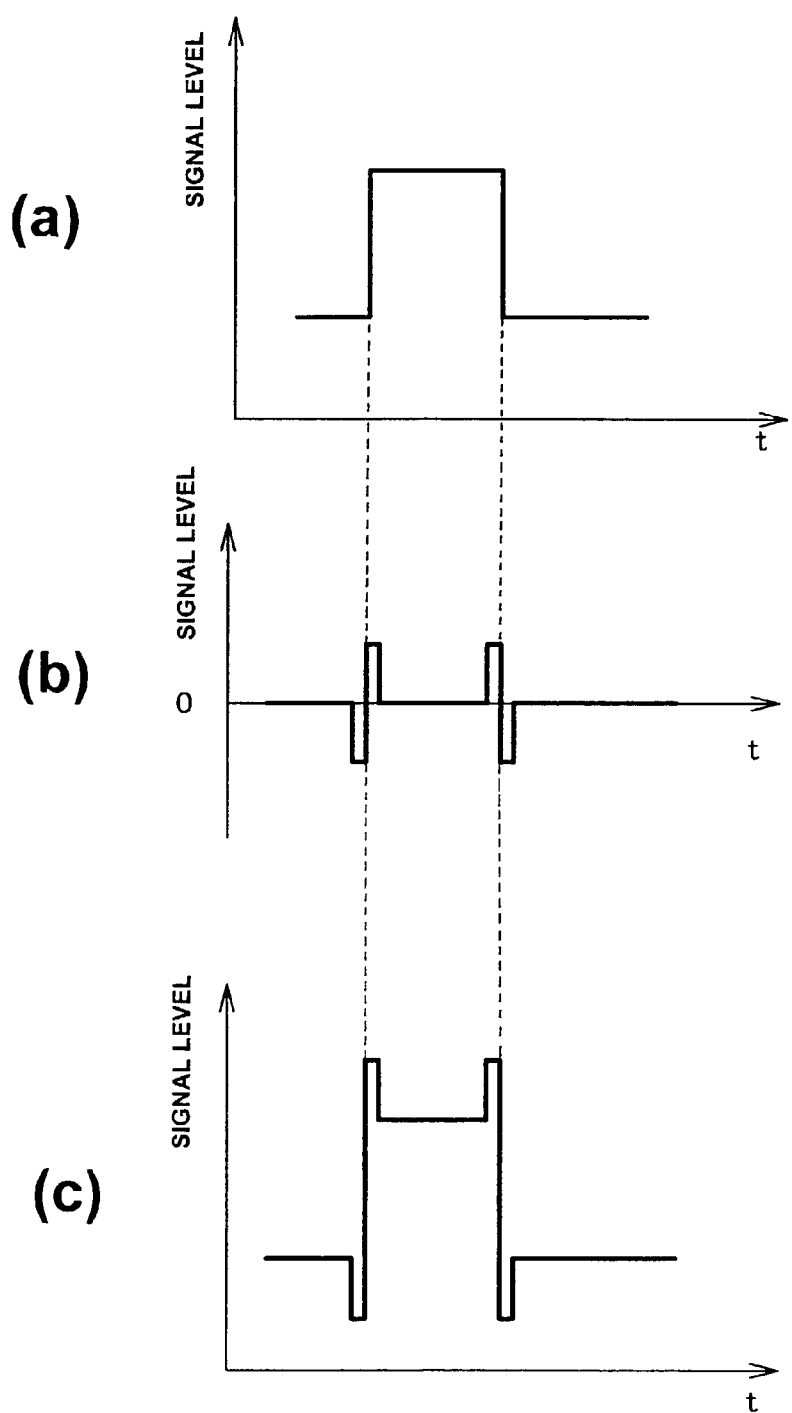
FIG. 1 show typical timing charts illustrating the principle of aperture compensation.
Figure 2:
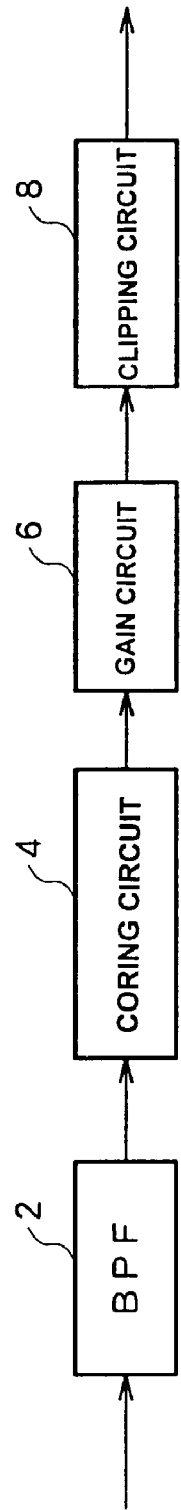
FIG. 2 is a general block diagram of an edge signal generator for generating an aperture signal.
Figure 3:
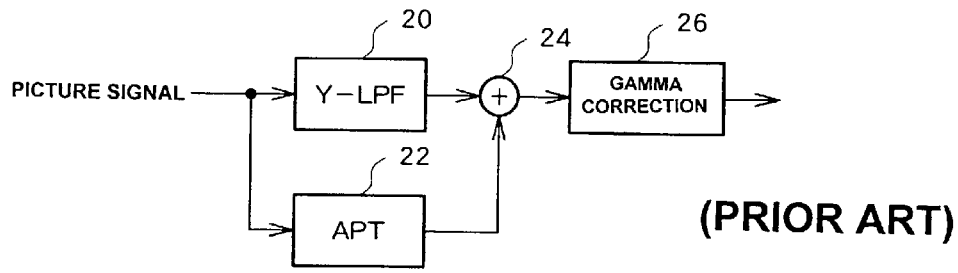
FIG. 3 is a simple block diagram of a signal processing circuit, which is the first conventional method for generating the luminance signal.
Figure 4:
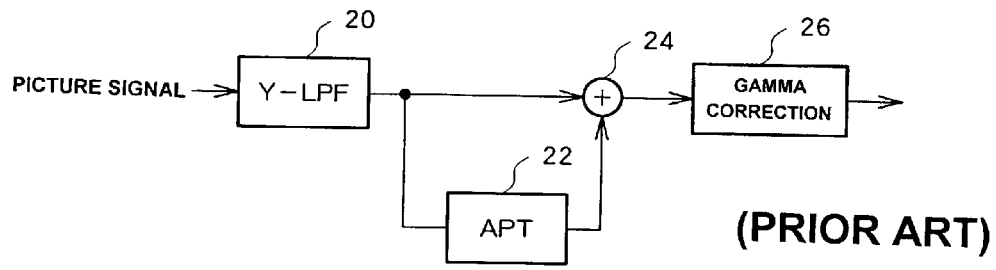
FIG. 4 is a simple block diagram of a signal processing circuit, which is the second conventional method for generating the luminance signal.
Figure 5:
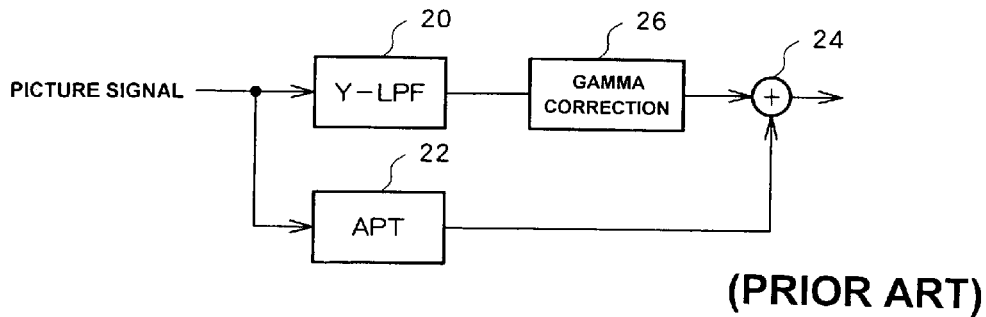
FIG. 5 is a simple block diagram of a signal processing circuit, which is the third conventional method for generating the luminance signal.
Figure 6:
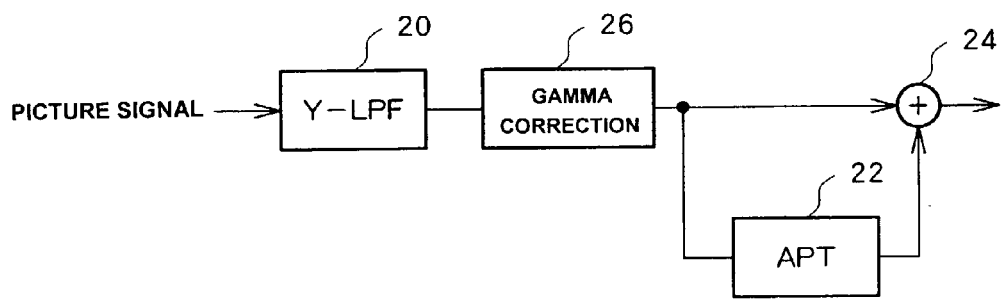
FIG. 6 is a simple block diagram of a signal processing circuit, which is the fourth conventional method for generating the luminance signal.

At the aperture signal generator 100, the picture signal is input by the A-LPF 52 and the edge signal generator 56. The edge signal generator 56 is generally the same as the conventional aperture signal generator that was described using FIG. 2 and extracts a frequency component of a specific frequency band of the luminance signal component extracted from the picture signal (original image signal) to generate the aperture signal (referred to hereinafter as the edge signal to distinguish it from the aperture signal that is ultimately output from the aperture signal generator 100).

An adder 102 generates a first intermediate image signal by adding the edge signal that is generated by the edge signal generator 56 and the original image signal that is output from the A-LPF 52. Here, the output of the adder 102 is called the edge addition image signal. Meanwhile, a subtracter 104 subtracts the edge signal, which is generated by the edge signal generator 56 from the original image signal that is obtained from the A-LPF 52, to generate a second intermediate image signal. Here, the output of the subtracter 104 is called the edge subtraction image signal. The edge addition image signal and the edge subtraction image signal are respectively input by edge signal gamma correction circuits 106, 108.

The edge signal gamma correction circuits 106, 108 on the basis of mutually identical non-linear conversion characteristics, perform gamma correction on the input signals. The gamma correction circuits perform a non-linear conversion on the basis of a gamma function $\Gamma_A(h)$ for suppressing level fluctuations of the output signal with higher input signal levels h.

The gamma function $\Gamma_A$ of the edge signal gamma correction circuits 106, 108 and the gamma function $\Gamma_Y$ of the Y signal gamma correction circuit 54 can be shared in common, or the aperture signal generation can also be performed more preferably using a $\Gamma_A$ that differs from $\Gamma_Y$.

The subtracter 110 subtracts the edge subtraction image signal after gamma correction obtained at the edge signal gamma correction circuit 108 from the edge addition image signal after gamma correction obtained at the edge signal gamma correction circuit 106. The output of the subtracter 110 is input as the aperture signal by an adder 42 from the aperture signal generator 100, and added with the gamma-corrected original image signal at the Y signal gamma correction circuit 54 to yield a contour-emphasized output image signal.

The operation of the luminance signal generator will be described next.

Figure 11:
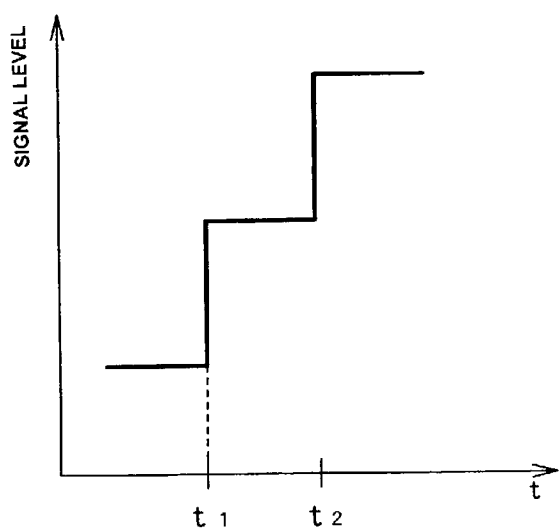
FIG. 11 shows a typical signal waveform of the original image signal for the purpose of describing the embodiment.
Figure 12:
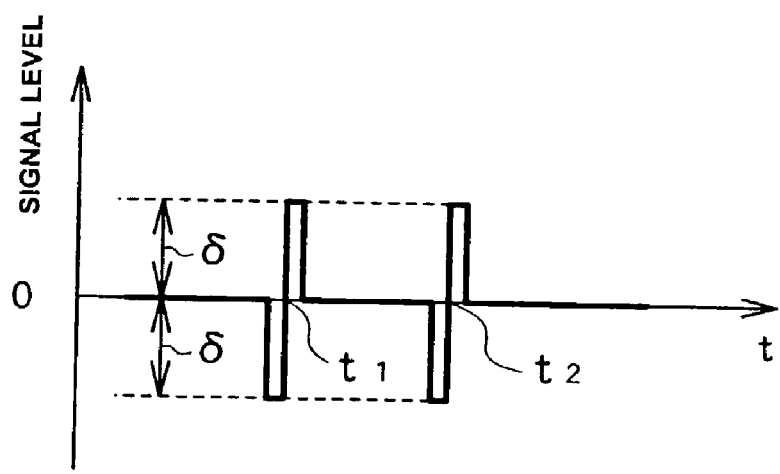
FIG. 12 shows a typical signal waveform of the edge signal that is output from an edge signal generator 56 in correspondence with the original image signal of FIG. 11.

FIG. 11 shows a typical signal waveform of the original image signal that is output from the A-LPF 52 and shows the waveform in which the original image signal rises in two identical P steps at $t_1$ and $t_2$. FIG. 12 shows a typical signal waveform of the edge signal that is output from the edge signal generator 56. The two step rise of the original image signal is similar, and the rise at either time $t_1$ or $t_2$ has an undershoot and overshoot of the same magnitude $\delta$ as the aperture signal.

Figure 13:
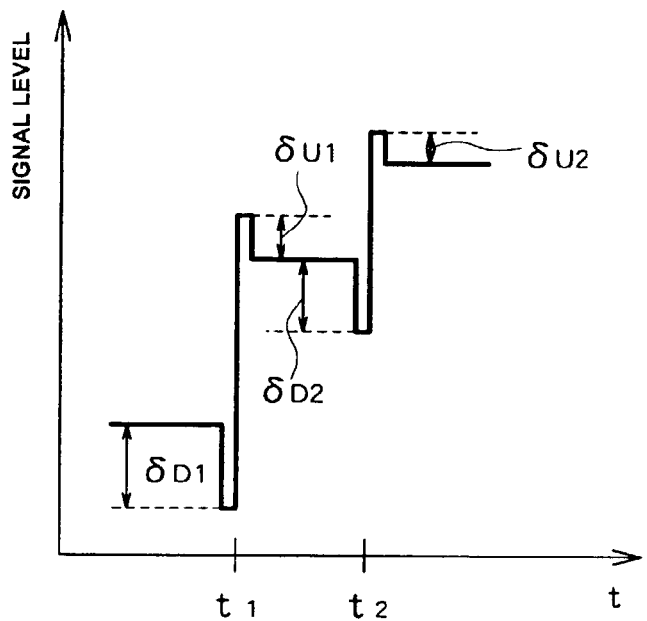
FIG. 13 is a typical signal waveform of the edge addition image signal after gamma correction.
Figure 14:
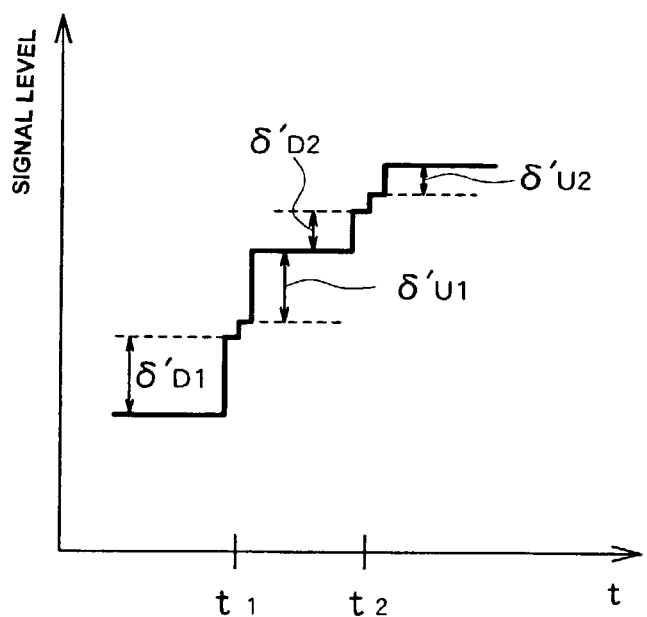
FIG. 14 is a typical signal waveform of the edge subtraction image signal after gamma correction.

The edge addition image signal and the edge subtraction image signal that are generated after gamma correction from the original image signal and the edge signal are shown in FIGS. 13 and 14. FIG. 13 shows the edge addition image signal that is output after gamma correction from the edge signal gamma correction circuit 106. It is assumed that the magnitudes of the undershoot and overshoot occurring before and after time $t_1$ of the edge addition image signal after gamma correction are $\delta_{D1}$ and $\delta_{U1}$, respectively, and the magnitudes of the undershoot and overshoot occurring before and after time $t_2$ are $\delta_{D2}$ and $\delta_{U2}$, respectively. As a result of the non-linear conversion based on gamma correction, the relationships among the magnitudes of the edge signals become: $\delta_{U1}<\delta_{D1}$, $\delta_{U2}<\delta_{D2}$, $\delta_{D2}<\delta_{D1}$, $\delta_{U2}<\delta_{U1}$. Meanwhile, FIG. 14 shows the edge subtraction image signal that is output after gamma correction from the edge signal gamma correction circuit 108. It is assumed that the magnitudes of the inverted signal of the undershoot and inverted signal of the overshoot occurring before and after time $t_1$ of the edge subtraction image signal after gamma correction are $\delta_{D1}$ and $\delta_{U1}$, respectively, and the magnitudes of the inverted signal of the undershoot and inverted signal of the overshoot occurring before and after time $t_2$ are $\delta_{D2}$ and $\delta_{U2}$, respectively. As a result of the non-linear conversion based on gamma correction, the relationships among the magnitudes of the edge signals become: $\delta'_{U1}<\delta'_{D1}$, $\delta'_{U2}<\delta'_{D2}$, $\delta'_{D2}<\delta'_{D1}$, $\delta'_{U2}<\delta'_{U1}$. Furthermore: $\delta_{U1}<\delta'_{U1}$, $\delta'_{D1}<\delta_{D1}$.

Figure 15:
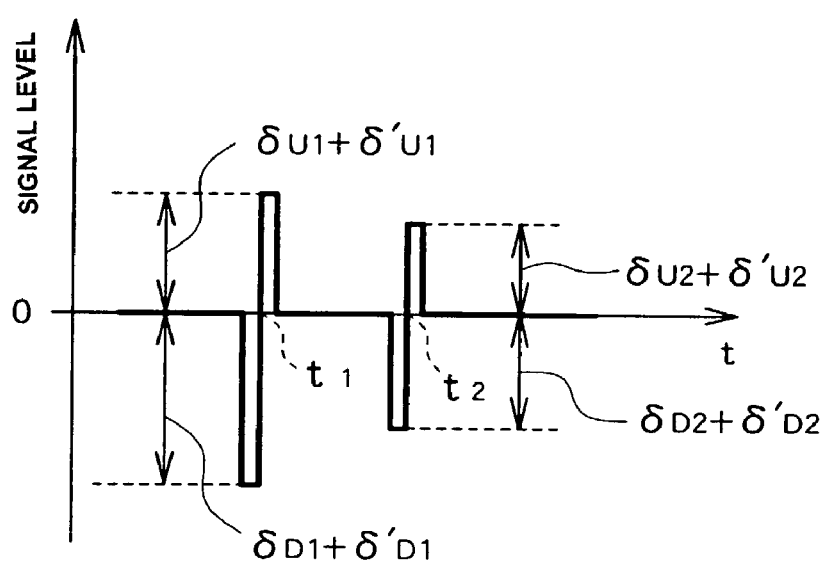
FIG. 15 is a typical signal waveform of the aperture signal that is output from a subtracter 110.

FIG. 15 shows a typical signal waveform of the aperture signal that is output from the subtracter 110. The subtracter 110 subtracts the output of the edge signal gamma correction circuit 108 shown in FIG. 14 from the output of the edge signal gamma correction circuit 106 shown in FIG. 13 to generate the aperture signal shown in FIG. 15. As shown in FIG. 15, the undershoot of the magnitude $(\delta_{D1}+\delta'_{D1})$ immediately prior to $t_1$ and the overshoot of the magnitude $(\delta_{U1}+\delta'_{U1})$ immediately subsequent to $t_1$ are created as aperture signals corresponding to time $t_1$. Furthermore, the undershoot of the magnitude $(\delta_{D2}+\delta'_{D2})$ immediately prior to $t_2$ and the overshoot of the magnitude $(\delta_{U2}+\delta'_{U2})$ immediately subsequent to $t_2$ are created as aperture signals corresponding to time $t_2$.

Figure 7:
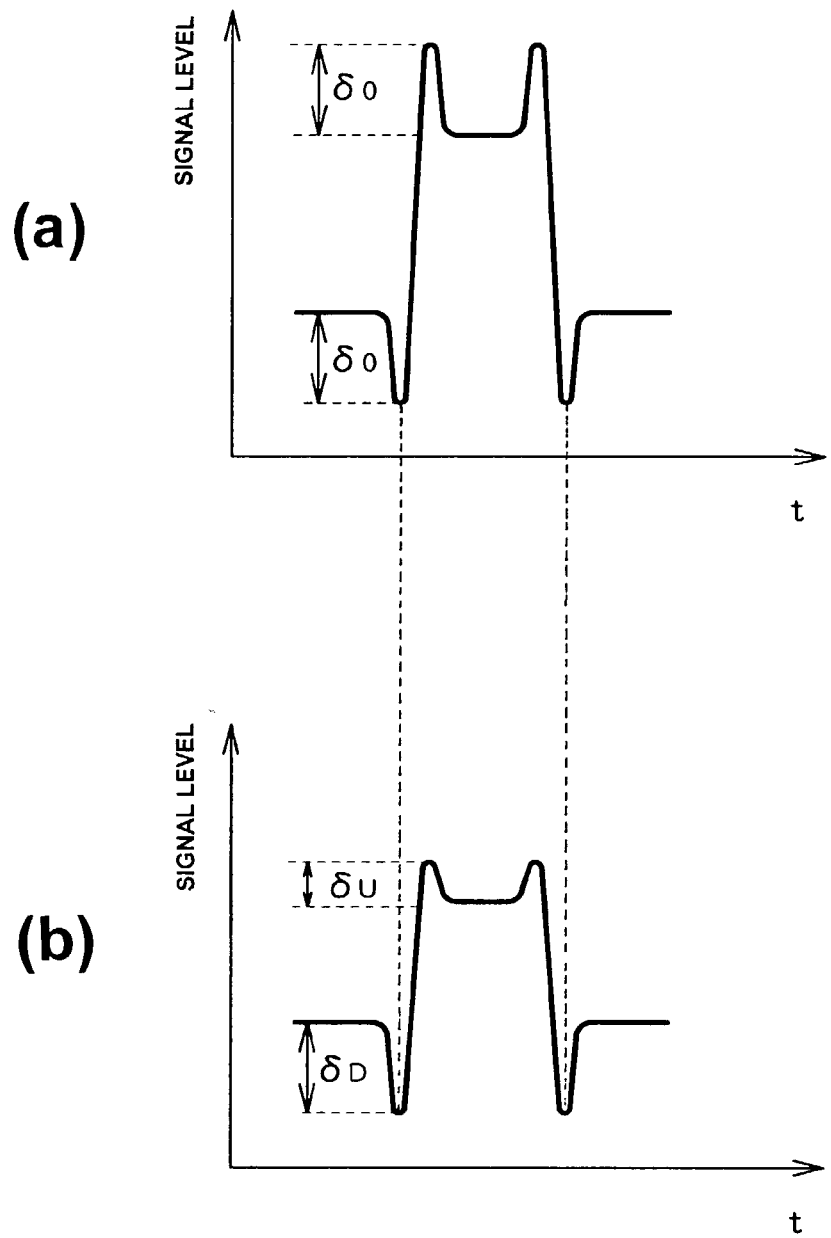
FIG. 7 shows typical signal waveforms illustrating a problem in the first and second conventional methods.
Figure 8:
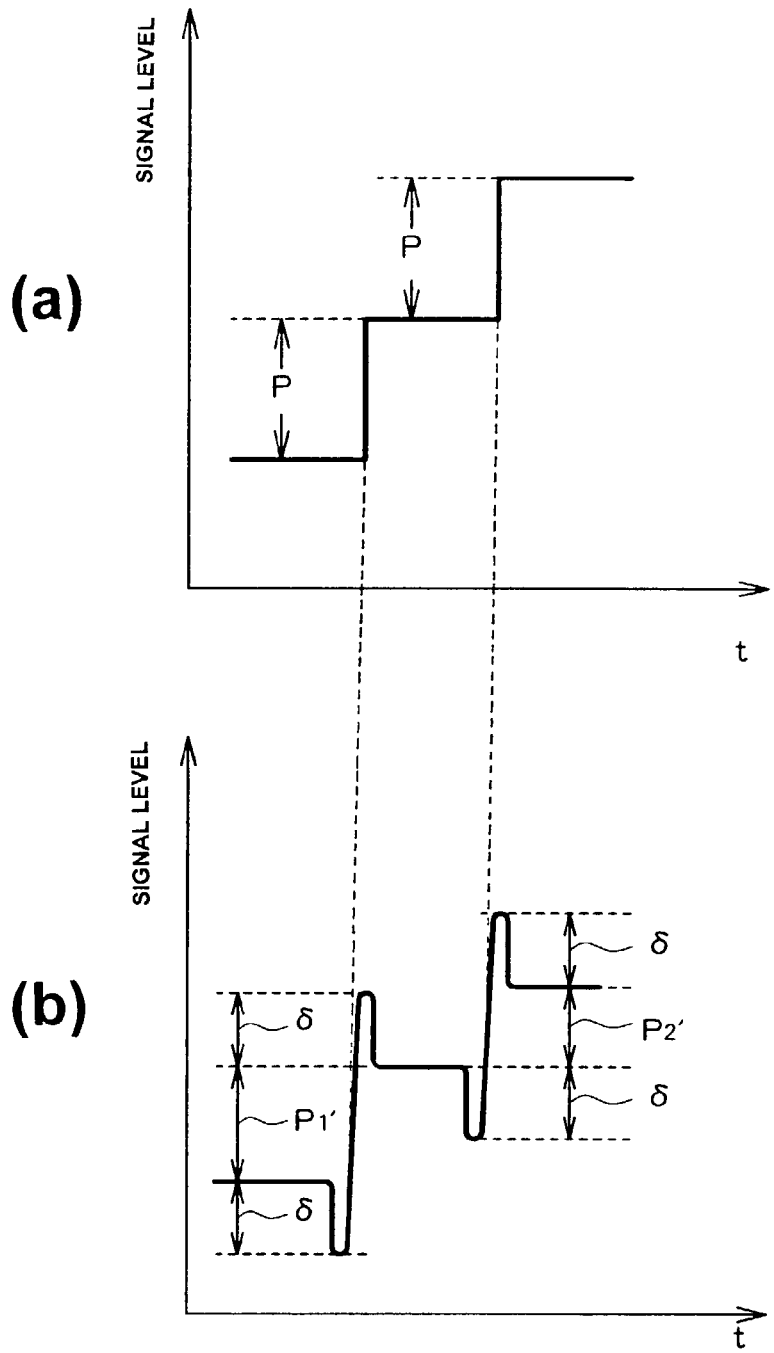
FIG. 8 shows typical signal waveforms illustrating a problem in the third conventional method.

Here, the ratio $R \equiv (\delta_{U1}+\delta'_{U1})/(\delta_{D1}+\delta'_{D1})$ of the magnitudes of the overshoot and the undershoot in the aperture signal obtained from the aperture signal generator 100 at time $t_1$ is compared to the ratio $R' \equiv \delta_U/\delta_D$ of the magnitudes of the overshoot and the undershoot in the conventional aperture signal. It can be seen from the comparison of FIG. 7(b) and FIG. 13 that $\delta_U$ corresponds to $\delta_{U1}$, and $\delta_D$ corresponds to $\delta_{D1}$ so that $R'=\delta_{U1}/\delta_{D1}$. Thus, $$R-R'=(\delta'_{U1}\delta_{D1}-\delta_{U1}\delta'_{D1})/(\delta_{D1}+\delta'_{D1})\delta_{D1}$$

is obtained. The numerator on the right side is positive since $\delta_{U1}<\delta'_{U1}$ and $\delta'_{D1}<\delta_{D1}$, resulting in $R>R'$. Furthermore, since $\delta_{U1}<\delta_{D1}$ and $\delta'_{U1}<\delta'_{D1}$, this yields $R<1$. Namely, $R'<R<1$ so that according to the aperture signal generator 100, the difference between the undershoot and the overshoot of the aperture signal in the same contour part is decreased. Namely, the problem of the first and second conventional methods is alleviated.

The magnitudes of the aperture signal at times $t_1$ and $t_2$ will be compared next. For example, the respective magnitudes $\Delta_{D1}$ and $\Delta_{D2}$ of the undershoot at times $t_1$ and $t_2$ will be compared. Here, $\Delta_{D1}=\delta_{D1}+\delta'_{D1}$ and $\Delta_{D2}=\delta_{D2}+\delta'_{D2}$. Since $\delta_{D2}<\delta_{D1}$ and $\delta'_{D2}<\delta'_{D1}$ as described above, $\Delta_{D2}<\Delta_{D1}$. Namely, the absolute value of the contour emphasized part becomes smaller at the high luminance side than at the low luminance side so that the problem of the third conventional method is alleviated.

Furthermore, since the edge signal gamma correction circuits 106, 108 are arranged in a stage subsequent to the edge signal generator 56, the problem of the fourth conventional method does not occur.

Figure 16:
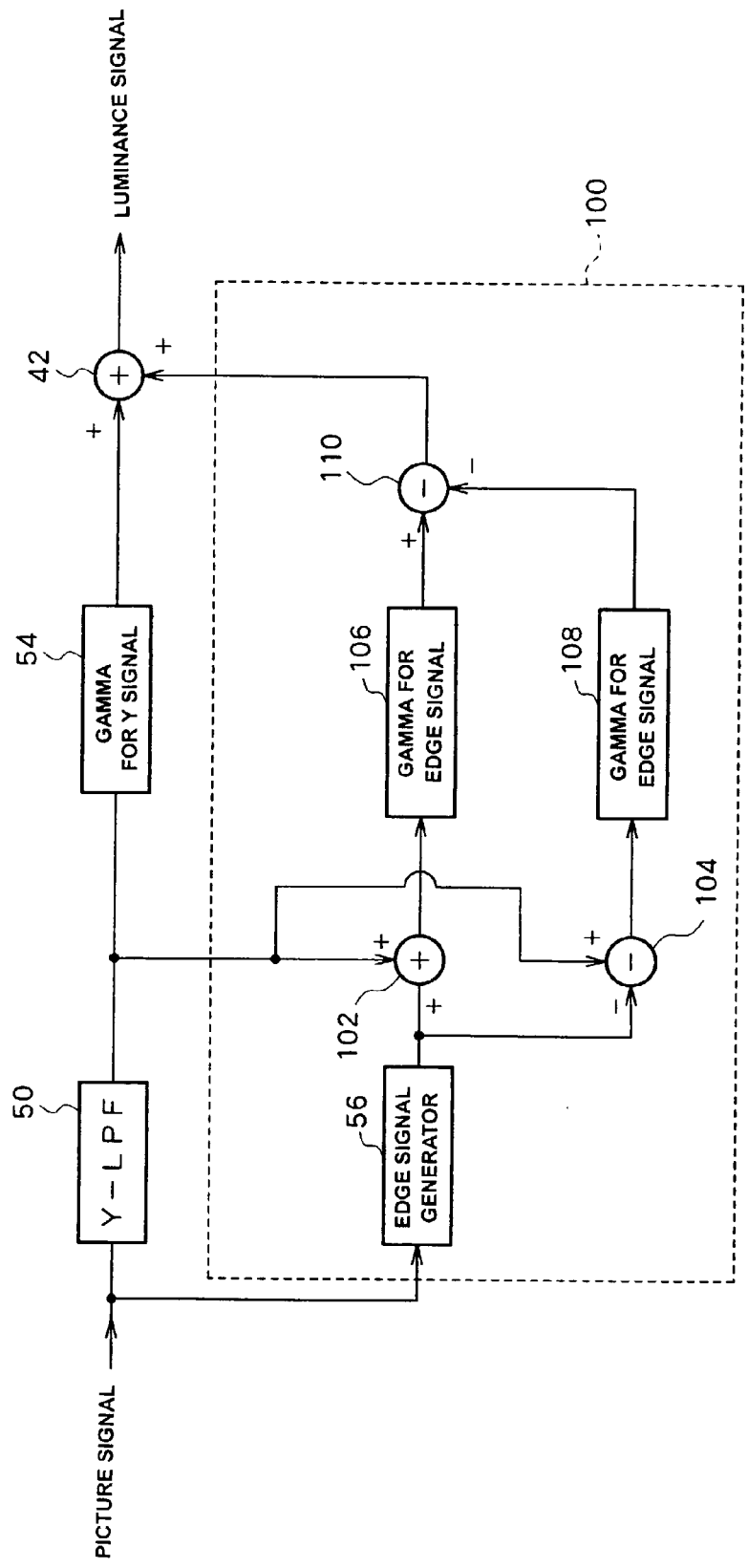
FIG. 16 is a block diagram showing an example of the first modified embodiment.

FIG. 16 is a block diagram showing an example of the first modified embodiment. In this configuration, the A-LPF 52 is not provided, and the output of the Y-LPF 50 is supplied to the adder 102 and the subtracter 104.

Figure 17:
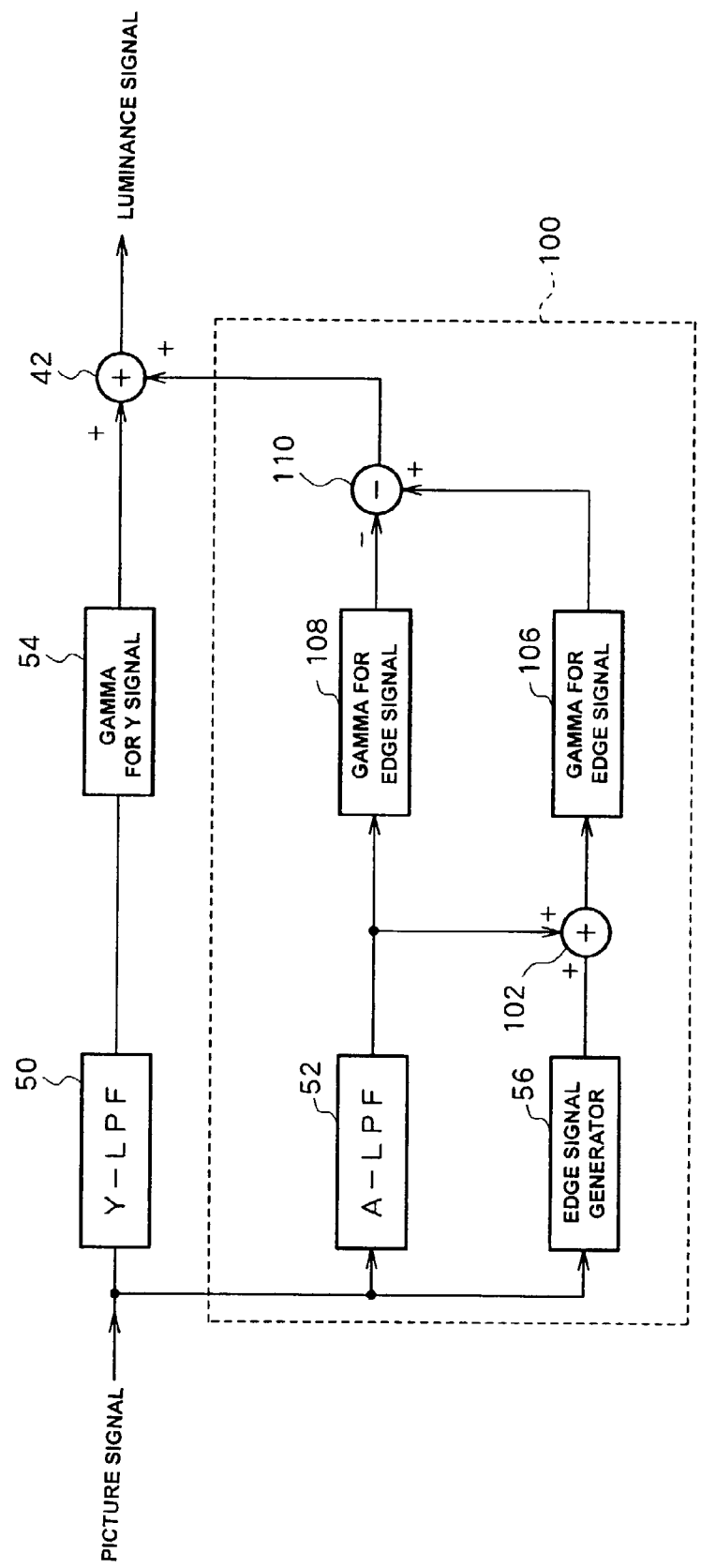
FIG. 17 is a block diagram showing an example of the second modified embodiment.

FIG. 17 is a block diagram showing an example of the second modified embodiment. In this configuration, the edge signal gamma correction circuits 106, 108 and the Y signal gamma correction circuits 54 are set with mutually differing gamma characteristics, and subtraction of the edge signal from the original image signal by the Y signal subtracter 104 is not performed. Namely, the edge subtraction image signal is not generated. Instead of the edge subtraction image signal, the output of the A-LPF 52 is input as the second intermediate image signal by the edge signal gamma correction circuit 108. At the subtracter 110, the difference between the gamma-corrected edge addition image signal and the gamma-corrected original image signal is generated as the aperture signal. Conversely, a configuration is also possible in which the adder 102 is not provided so that the edge addition image signal is not generated.

Figure 18:
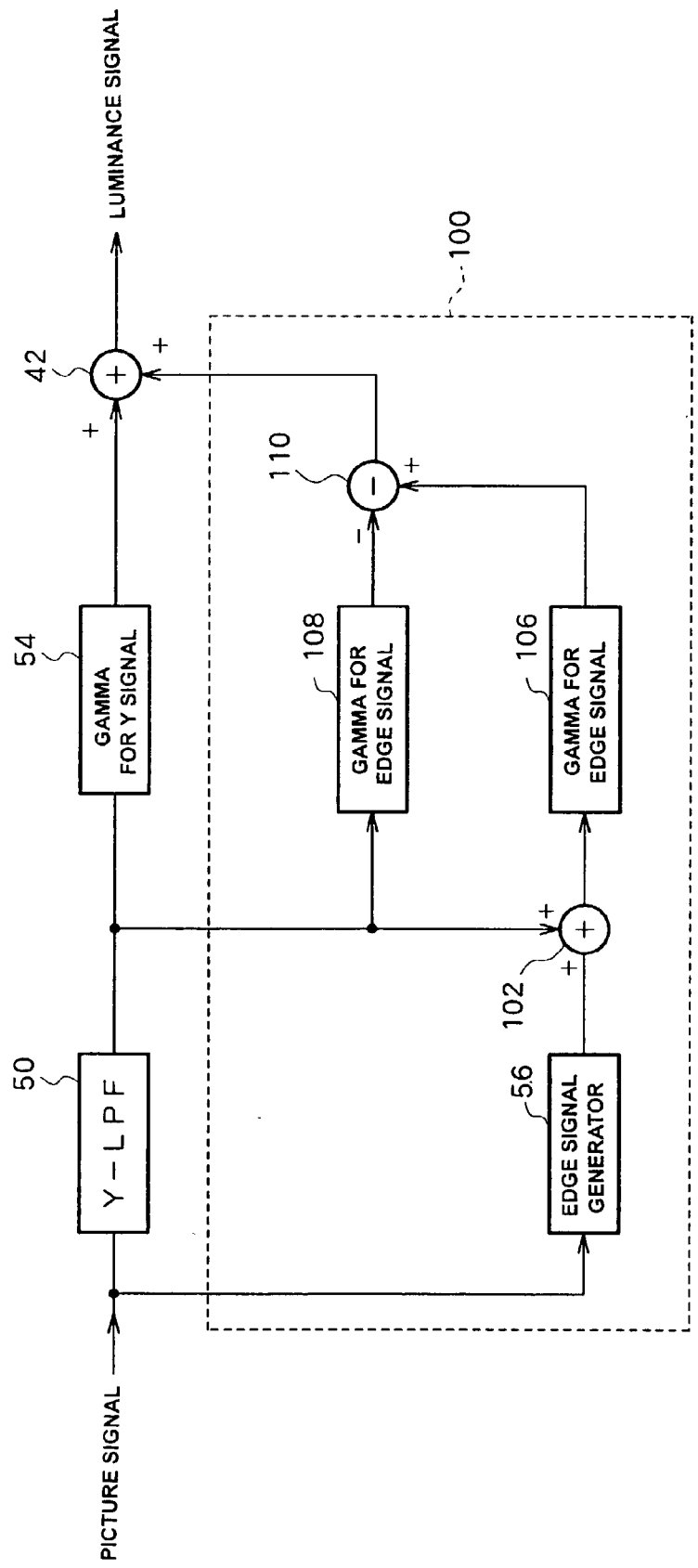
FIG. 18 is a block diagram showing an example of the third modified embodiment.

FIG. 18 is a block diagram of an example of third modified embodiment. In this configuration, the A-LPF 52 given in the configuration shown in FIG. 17 is not provided, and the output of the Y-LPF 50 is used as the input to the edge signal gamma correction circuit 108 and the adder 102.

According to the aperture compensation circuit for the image signal of the present invention, a visually preferable contour emphasis is performed regardless of level differences in the luminance signal.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An image signal processing apparatus for emphasizing a specific frequency component of an image signal and clarifying the contour of a reproduced image, comprising:
   a first gamma correction circuit for performing gamma correction with respect to an original image signal on the basis of first non-linear characteristic conversions;
   an edge signal generation circuit for generating an edge signal by extracting a specific frequency component of said original image signal;
   a second gamma correction circuit for performing gamma correction in accordance with second non-linear characteristic conversions with respect to a first intermediate image signal that is generated on the basis of said original image signal and said edge signal;
   a third gamma correction circuit for performing gamma correction in accordance with said second non-linear characteristic conversions with respect to a second intermediate image signal that is generated on the basis of said original image signal;
   a subtraction circuit for generating an aperture signal by calculating the difference between the gamma-corrected first intermediate image signal and the gamma-corrected second intermediate image signal; and
   an addition circuit for generating an output image signal by adding said aperture signal to the gamma-corrected original image signal.

2. An image signal processing apparatus according to claim 1, comprising:
   a first filter circuit for generating, and supplying to said first gamma correction circuit, a first luminance signal by attenuating a first frequency band of said original image signal; and
   a second filter circuit for generating a second luminance signal by attenuating a second frequency band of said original image signal;
   and wherein:
   said first intermediate image signal is generated by adding said edge signal to said second luminance signal; and
   said second intermediate image signal is generated by subtracting said edge signal from said second luminance signal.

3. An image signal processing apparatus according to claim 2, wherein attenuation characteristics of said first filter circuit are set steeper than attenuation characteristics of said second filter circuit.

4. An image signal processing apparatus according to claim 1, comprising:
   a filter circuit for generating, and supplying to said first gamma correction circuit, a luminance signal by attenuating a specific frequency band of said original image signal;

and wherein:
said first intermediate image signal is generated by adding said edge signal to said luminance signal; and
said second intermediate image signal is generated by subtracting said edge signal from said luminance signal.

5. An image signal processing apparatus according to claim 1, comprising:
a first filter circuit for generating, and supplying to said first gamma correction circuit, a first luminance signal by attenuating a first frequency band of said original image signal; and
a second filter circuit for generating a second luminance signal by attenuating a second frequency band of said original image signal;
and wherein:
said first intermediate image signal is generated by adding said edge signal to said second luminance signal; and
said second intermediate image signal is said second luminance signal.

6. An image signal processing apparatus according to claim 5, wherein attenuation characteristics of said first filter circuit are set steeper than attenuation characteristics of said second filter circuit.

7. An image signal processing apparatus according to claim 1, comprising:
a filter circuit for generating, and supplying to said first gamma correction circuit, a luminance signal by attenuating a specific frequency band of said original image signal;
and wherein:
said first intermediate image signal is generated by adding said edge signal to said luminance signal; and
said second intermediate image signal is said luminance signal.

* * * * *